US010904591B2

(12) United States Patent
Schmidt

(10) Patent No.: US 10,904,591 B2
(45) Date of Patent: Jan. 26, 2021

(54) SCHEME FOR ZERO-COPY ADAPTIVE BITRATE VIDEO STREAMING

(71) Applicant: Google Inc., Mountain View, CA (US)

(72) Inventor: Brian Schmidt, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 195 days.

(21) Appl. No.: 15/710,062

(22) Filed: Sep. 20, 2017

(65) Prior Publication Data

US 2018/0184142 A1 Jun. 28, 2018

Related U.S. Application Data

(60) Provisional application No. 62/439,618, filed on Dec. 28, 2016.

(51) Int. Cl.
*H04N 21/2343* (2011.01)
*H04N 21/2368* (2011.01)
(Continued)

(52) U.S. Cl.
CPC ... *H04N 21/234381* (2013.01); *H04N 19/132* (2014.11); *H04N 19/146* (2014.11);
(Continued)

(58) Field of Classification Search
CPC .. H04N 19/132; H04N 19/146; H04N 19/184; H04N 21/2187; H04N 21/23406;
(Continued)

(56) References Cited

U.S. PATENT DOCUMENTS

2007/0091999 A1* 4/2007 Nissan-Cohen ....... H04N 7/015
375/240.2
2007/0097257 A1 5/2007 El-Maleh et al.
(Continued)

FOREIGN PATENT DOCUMENTS

WO 2008/154742 A1 12/2008
WO WO-2008154742 A1 * 12/2008 ........... H04N 19/142

OTHER PUBLICATIONS

International Search Report and Written Opinion dated Mar. 12, 2018 on application No. PCT/US2017/053490.

*Primary Examiner* — William C Vaughn, Jr.
*Assistant Examiner* — Naod W Belai
(74) *Attorney, Agent, or Firm* — Lowenstein Sandler LLP

(57) ABSTRACT

Implementations disclose zero-copy adaptive bitrate video streaming. A method includes capturing, by a user device, a first video frame of a plurality of video frames of a video item to be transmitted as a livestream; delivering the first video frame to an encoder of the user device; capturing a second video frame of the plurality of video frames, the second video frame being captured after the first video frame; delivering the second video frame to the encoder of the user device; in response to determining that the first video frame did not enter the encoder prior to the second video frame arriving at the encoder, discarding the first video frame; determining, by the user device, a frequency of discarded video frames comprising the first video frame; and adjusting, by a processing device of the user device, quality of the video item transmitted as the livestream based on the frequency.

17 Claims, 4 Drawing Sheets

(51) Int. Cl.
    *H04N 21/2187*    (2011.01)
    *H04N 19/132*     (2014.01)
    *H04N 19/184*     (2014.01)
    *H04N 19/146*     (2014.01)
    *H04N 21/6373*    (2011.01)
    *H04N 21/24*      (2011.01)
    *H04N 21/234*     (2011.01)

(52) U.S. Cl.
    CPC ....... *H04N 19/184* (2014.11); *H04N 21/2187* (2013.01); *H04N 21/2368* (2013.01); *H04N 21/23406* (2013.01); *H04N 21/24* (2013.01); *H04N 21/6373* (2013.01)

(58) Field of Classification Search
    CPC ....... H04N 21/234381; H04N 21/2368; H04N 21/24; H04N 21/6373
    USPC .................................................... 375/240.26
    See application file for complete search history.

(56) References Cited

U.S. PATENT DOCUMENTS

| | | | |
|---|---|---|---|
| 2009/0204790 A1* | 8/2009 | Khan ........................ | G06T 1/00 |
| | | | 712/200 |
| 2010/0135521 A1* | 6/2010 | Zhang ................. | G06K 9/00751 |
| | | | 382/100 |
| 2014/0104493 A1* | 4/2014 | Liu ...................... | H04N 19/132 |
| | | | 348/441 |

* cited by examiner

US 10,904,591 B2

SCHEME FOR ZERO-COPY ADAPTIVE BITRATE VIDEO STREAMING

RELATED APPLICATION

This application is related to and claims the benefit of U.S. Provisional Patent Application No. 62/439,618, filed on Dec. 28, 2016, the entirety of which is incorporated herein by reference.

TECHNICAL FIELD

This disclosure relates to the field of video streaming and, in particular, to zero-copy adaptive bitrate video streaming.

BACKGROUND

Livestream videos may be captured and transmitted by a user device over a network. Available bandwidth of a network may vary by location and by time of day. As available bandwidth of the network varies, the bitrate of the livestream video may be adjusted accordingly (e.g., adaptive bitrate (ABR) streaming). A user device may adjust bitrate of the livestream by using a transmission buffer (e.g., copying video frames into the transmission buffer). Use of a transmission buffer may not address causes of delay that occur prior to copying the video frames into the transmission buffer. Use of a transmission buffer may cause increased latency and increased resource cost.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes capturing, by a user device, a first video frame of a plurality of video frames of a video item to be transmitted as a livestream; delivering the first video frame to an encoder of the user device, capturing a second video frame of the plurality of video frames of the video item to be transmitted as the livestream, the second video frame being captured after the first video frame, delivering the second video frame to the encoder of the user device, in response to determining that the first video frame did not enter the encoder prior to the second video frame arriving at the encoder, discarding the first video frame, determining, by the user device, a frequency of discarded video frames including the first video frame, and adjusting, by a processing device of the user device, quality of the video item transmitted as the livestream based on the frequency.

In one implementation, the method further includes capturing a third video frame of the plurality of video frames, the third video frame being captured after the second video frame, in response to determining the second video frame entered the encoder prior to the third video frame arriving at the encoder, not discarding the second video frame, encoding, by the encoder, the second video frame to generate an encoded video frame, and multiplexing, by the user device, the encoded video frame with encoded audio data to generate multiplexed data, where the video item transmitted as the livestream includes the multiplexed data.

In one implementation, the second video frame is captured at a frame rate of the user device and a resolution of the user device, the second frame is encoded at an encode bitrate of the encoder, determining the frequency includes determining the frequency is above a first threshold frequency, and adjusting the quality of the livestream includes reducing one or more of the frame rate of the user device, the resolution of the user device, or the encoder bitrate of the encoder. In another implementation, the second video frame is captured at a frame rate of the user device and a resolution of the user device, the second frame is encoded at an encode bitrate of the encoder, determining the frequency includes determining the frequency is below a second threshold frequency, and adjusting the quality of the livestream includes increasing one or more of the frame rate of the user device, the resolution of the user device, or the encoder bitrate of the encoder.

In one implementation, the method further includes monitoring the plurality of video frames, the encoded audio data, and processing overhead of the user device, creating metrics based on the monitoring, and combining the metrics into a unified value, where adjusting the quality of the livestream is further based on the unified value. In one implementation, the livestream is an adaptive bitrate (ABR) video stream. In one implementation, transmitting of the livestream and adjusting the livestream is without use of a buffer.

BRIEF DESCRIPTION OF THE DRAWINGS

The present disclosure is illustrated by way of example, and not by way of limitation, in the figures of the accompanying drawings.

DETAILED DESCRIPTION

Figure 1:
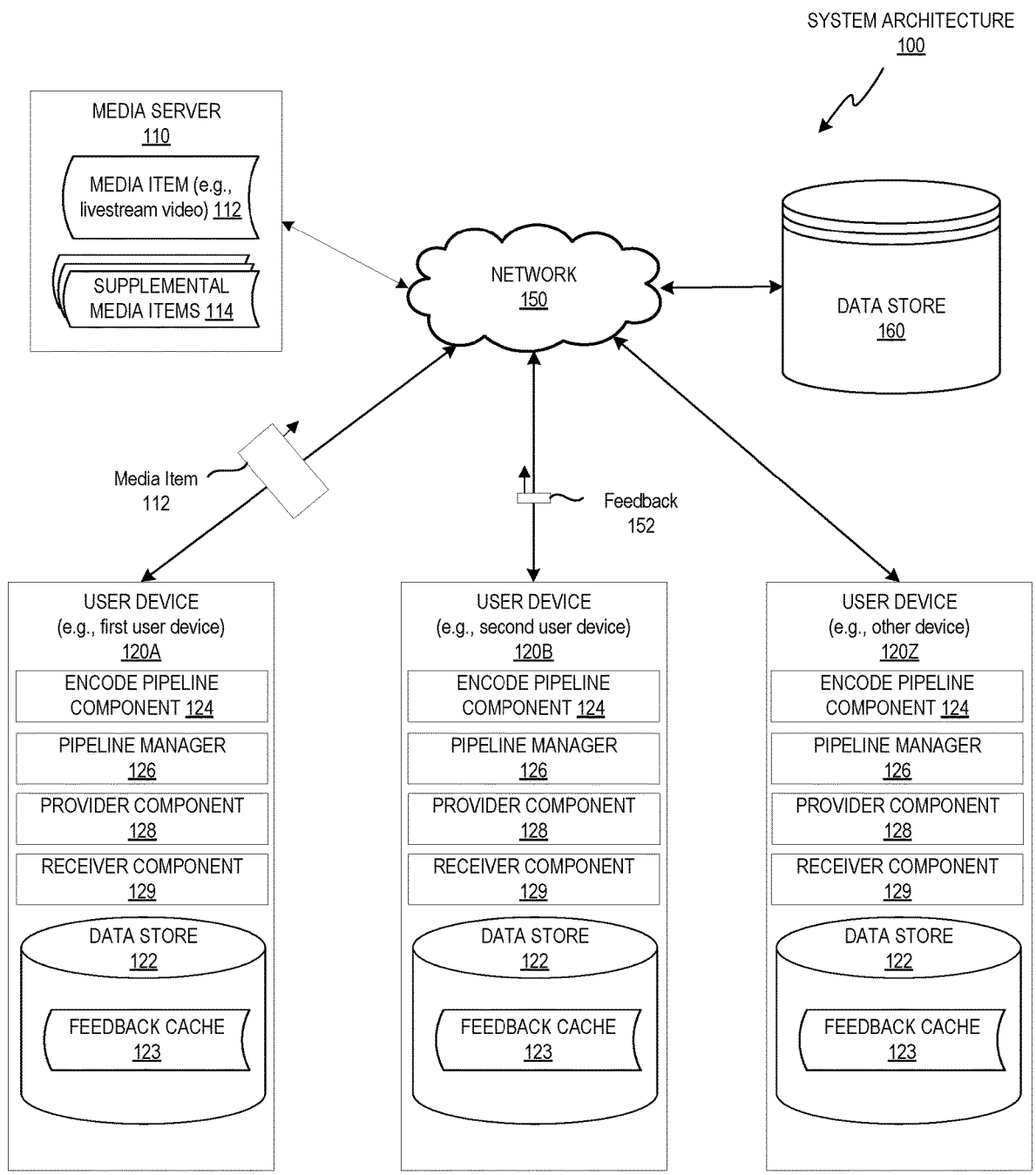
FIG. 1 is a block diagram illustrating an exemplary system architecture, in accordance with an implementation of the disclosure.

Aspects and implementations of the disclosure are directed to zero-copy adaptive bitrate video streaming. Livestreaming includes capturing live media (e.g., video, audio, screenshots, etc.) and transmitting the live media over a network. For example, a mobile device may capture and transmit livestream video and audio over a wireless network. For media to be transmitted live (e.g., without delay, less than a threshold amount of delay), the bitrate of the livestream cannot be higher than the available bitrate of the network. A livestream may refer to video content, audio content, and/or user interface content (e.g., content displayed on a user interface of a user device) that is transmitted at the time of occurrence (e.g., transmitted live). The available bitrate (e.g., available bandwidth, connection quality) of a network can vary widely. Livestreams may be transmitted at an adaptive bitrate (ABR) to accommodate changes in available bandwidth of the network. An adaptive bitrate may refer to quality (e.g., bitrate) of a livestream that may be adjusted. The quality of the livestream may be adjusted based on available bandwidth of the network (e.g., available bitrate) and/or capacity of the user device (e.g., local processing overhead, bitrate of capturing media, bitrate of encoding media, etc.).

Livestreaming includes a video encode pipeline of capturing a video frame, encoding the video frame, multiplexing the encoded video frame with encoded audio, and transmitting the multiplexed data over the network as a livestream. The bitrate of the livestream is affected by frame rate, resolution, audio sample rate, encoder bit rate, local processing overhead, and so forth. Available bandwidth of the network fluctuates depending on proximity of the user device to a network connection device and capacity of the network connection device (e.g., wireless router, cell tower, etc.), the network connection that the user device is using (e.g., a wireless network connection, a cellular data network connection, etc.), the network-based processes currently operating on the user device (e.g., downloads, uploads, etc.), multiple user devices using the same connection to the network, and so forth. The available bandwidth for livestreaming may vary by time of day and location.

Traditionally, to provide for an ABR video stream, prior to transmitting a video stream, the multiplexed data is copied into a transmission buffer. The multiplexed data is transmitted from the transmission buffer over the network according to the available bandwidth of the network. Copying the multiplexed data and waiting to transmit the multiplexed data may add latency to the video stream (e.g., seconds of delay). Copying the multiplexed data into the transmission buffer typically requires memory and processing overhead of the user device. Providing the transmission buffer at the end of the video encode pipeline (e.g., waiting to the end of the pipeline to provide for an ABR stream) may not address delay issues that occur earlier in the pipeline (e.g., resolution, frame rate, encoder bitrate, audio delay, local processing overhead, etc.).

Aspects of the present disclosure address the above and other deficiencies by providing zero-copy ABR video streaming. Zero-copy ABR video streaming refers to capturing and transmitting video frames as a video stream (e.g., livestream) without copying the video frames (e.g., without copying the video frames into a transmission buffer). For example, zero-copy ABR streaming may include capturing video frames, encoding the video frames, multiplexing the video frames, and transmitting the video frames, where the video frames are not copied during the zero-copy ABR streaming. In one example, the zero-copy ABR streaming is performed by a user device. In another example, one or more aspects of the zero-copy ABR streaming are performed by a network device (e.g., media server). The user device may be a mobile device (e.g., phone, tablet, laptop, smart watch, etc.), a laptop, a desktop, etc. and may be capable of adjusting quality of a livestream.

In one example, the user device captures video frames including a first video frame and a second video frame of a video item to be transmitted as a livestream and when a first video frame does not enter the encoder of a user device prior to a second video frame arriving at the encoder, the first video frame is discarded. The user device determines frequency of discarded video frames and adjusts the quality of the video item transmitted on the livestream based on the frequency without using a buffer.

The technology disclosed herein is advantageous because it facilitates ABR streaming without relying on a buffer, eliminates resource cost of the buffer, and eliminates the latency the buffer introduces. By adjusting the quality of the livestream instead of adding latency of a buffer to a livestream, the technology disclosed herein also provides a more enjoyable and engaging experience for viewers of livestreams, thereby encouraging users to watch livestream videos and interact with livestream videos. Furthermore, by reducing latency of the livestream, the technology disclosed herein allows for communication with reduced latency between the user of the user device transmitting the livestream and a second user of a second user device receiving the livestream, thereby improving the overall user experience with platforms providing livestream videos.

Implementations of the disclosure often reference videos for simplicity and brevity. However, the teaching of the present disclosure are applied to media items generally and can be applied to various types of content or media items, including for example, video, audio, text, images, program instructions, etc. The content or media items may be livestream content or livestream media items, including for example, livestream video, livestream audio, livestream text, livestream images, livestream program instructions, etc.

FIG. 1 illustrates an example system architecture 100, in accordance with one implementation of the disclosure. The system architecture 100 includes media server 110, user devices 120A-Z, a network 150, and a data store 160.

Media server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. Media server 110 may be a part of a content sharing platform that may allow users to consume, upload, share, search for, approve of ("like"), dislike, and/or comment on media items including livestream videos. The content sharing platform may also include a website (e.g., a webpage) or application back-end software that may be used to provide a user with access to the media items.

Media server 110 may host content, such as media items 112 and supplemental media items 114. Media items 112 and supplemental media items 114 may be digital content chosen by a user, digital content made available by a user, digital content uploaded by a user, digital content chosen by a content provider, digital content chosen by a broadcaster, livestream digital content, etc. Examples of media items 112 and supplemental media items 114 include, and are not limited to, digital video, digital movies, digital photos, digital music, website content, social media updates, electronic books (eBooks), electronic magazines, digital newspapers, digital audio books, electronic journals, web blogs, real simple syndication (RSS) feeds, electronic comic books, software applications, etc.

Media items 112 and supplemental media items 114 may be consumed via the Internet and/or via a mobile device application. For brevity and simplicity, an online livestream video (also hereinafter referred to as a livestream video) is used as an example of a media item 112 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform may store the media items 112 using the data store 160. In one example, media item 112 may be a livestream video transmitted by user device 120A and presented to a user of user device 120B and supplemental media item 114 may be an advertisement selected by media server 110 to be presented before, during or after presenting media item 112 on one or more of the user devices 120A-Z.

User devices 120A-Z may each include computing devices such as personal computers (PCs), laptops, mobile phones, smart phones, tablet computers, netbook computers, network-connected televisions, etc. In some implementations, user devices 120A-Z may also be referred to as "user devices." User devices 120A-Z may be capable of transmitting and receiving media items 112 over a network 150 and may be capable of causing feedback 152 to be transmitted to other user devices via network 150. Feedback 152 is a communication sent by a user device 120 to another user device or the media server 110 that may be associated with a media item 112. For example, feedback 152 may be a comment by a user about a media item 112, a conversation message between a first user and a second user about a media item 112, and/or a post by a user on a user interface that displays a media item 112. In one implementation, user device 120 may transmit feedback 152 to the media server 110 via network 150 and the media server 110 may associate the feedback 152 with the media item 112. In another implementation, user device 120B may transmit feedback 152 to user device 120A regarding a media item 112 captured and transmitted by user device 120A.

Network 150 may be a public network that provides one or more of user devices 120A-Z with access to media server 110 and other publically available computing devices. Network 150 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

Each of user devices 120A-Z may include a media viewer that allows users to view media items 112, conversation messages (e.g., text messages or chat messages), feedback 152, and/or notifications that are transmitted over network 150. The media viewer may present images, videos, audio, web pages, documents, etc. In one example, the media viewer may be a web browser that can access, retrieve, present, and/or navigate content (e.g., web pages such as Hyper Text Markup Language (HTML) pages, digital media items, text conversations, notifications, etc.) served by a web server. The media viewer may render, display, and/or present the content to a user. The media viewer may also display an embedded media player (e.g., a Flash® player or an HTML5 player) that is embedded in a web page (e.g., a web page that may provide information about a product sold by an online merchant). In another example, the media viewer may be a standalone application (e.g., a mobile application or app) that allows users to view digital media items (e.g., digital videos, digital images, electronic books, etc.), to participate in text conversations, and to receive notifications.

According to aspects of the disclosure, the media viewer may allow users to watch content, participate in a conversation, and share, record, edit, and/or upload livestream content to the content sharing platform. The media viewer may be provided to user devices 120A-Z by media server 110 or a content sharing platform. For example, the media viewer may be an embedded media player (as well as other components) included in web pages provided by the content sharing platform. In another example, the media viewer may be an application that is provided by the content sharing platform and is installed and executed on user device 120A-Z.

In the example shown in FIG. 1, each user device may include an encode pipeline component 124, a pipeline manager 126, a provider component 128, a receiver component 129, and a data store 122. Data store 122 may be a memory (e.g., random access memory), a drive (e.g., a hard drive, a flash drive), a database system, or another type of component or device capable of storing data. Data store 122 may include multiple storage components (e.g., multiple drives or multiple databases) that may span multiple computing devices (e.g., multiple server computers). Data store 122 may include a feedback cache 123 that stores copies of feedback 152 that are received from the media server 110 or a user device 120A-120Z. In one example, each feedback 152 may be a file that is received from media server 110 or a user device 120A-120Z and may be stored locally in feedback cache 123. In another example, each feedback 152 may exist as an ephemeral copy in memory of a user device until it is off-lined. An ephemeral copy may be a temporal copy of the feedback 152 that is made in a digital transmission process (e.g., transmitting of feedback 152 to user device 120A), as data is transmitted from user device 120B or media server 110 to user device 120A. The ephemeral copy may reside in memory of a user device for a short period of time (e.g., until the feedback 152 is copied into feedback cache 123 of data store 122). Off-lining refers to a user device storing an ephemeral copy of the feedback 152 in persistent data storage of the user device. This may enable the user device to access the feedback 152 at a later point in time (e.g., after a reboot) without using an internet connection. In one example, the feedback 152 may be transmitted by the user device to itself when presenting the feedback 152. In one example, a user device may off-line a feedback item by copying one or more feedback items to the persistent data storage.

Encode pipeline component 124 may include functionality to capture video frames, encode the video frames, multiplex the encoded video frames with audio, and transmit the multiplexed data over network 150 (e.g., to other user devices 120, to media server 110).

Pipeline manager 126 may include functionality to discard a first video frame that has not entered the encoder prior to a second video frame arriving at the encoder, determine a frequency of discarded video frames, monitor metrics of the user device, and adjust the quality of the livestream based on the frequency and metrics.

Provider component 128 may include functionality that enables a user device to cause feedback 152 to be transmitted to one or more other user devices.

Receiver component 129 may include functionality that enables the user device to receive media items 112 and feedback 152.

In general, functions described in one implementation as being performed by the media server 110 can also be performed on the user devices 120A through 120Z in other implementations, if appropriate. In general, functions described in one implementation as being performed by on the user devices 120A through 120Z can also be performed on the media server 110 in other implementations, if appropriate. In addition, the functionality attributed to a particular component can be performed by different or multiple components operating together. The content sharing platform and media server 110 can also be accessed as a service provided to other systems or devices through appropriate application programming interfaces, and thus is not limited to use in websites.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the content sharing platform.

Although implementations of the disclosure are discussed in terms of a media server and a content sharing platform, implementations may also be generally applied to any type of social network providing digital content and connections between users.

In situations in which the systems discussed here collect personal information about users, or may make use of personal information, the users may be provided with an opportunity to control whether the content sharing platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform. In another example, a livestream may only be transmitted to contacts of the user. In another example, the user may select to which users the user wants to make available the livestream and the livestream will be available only to those users. Thus, the user may have control over with whom livestreams are shared.

Figure 2:
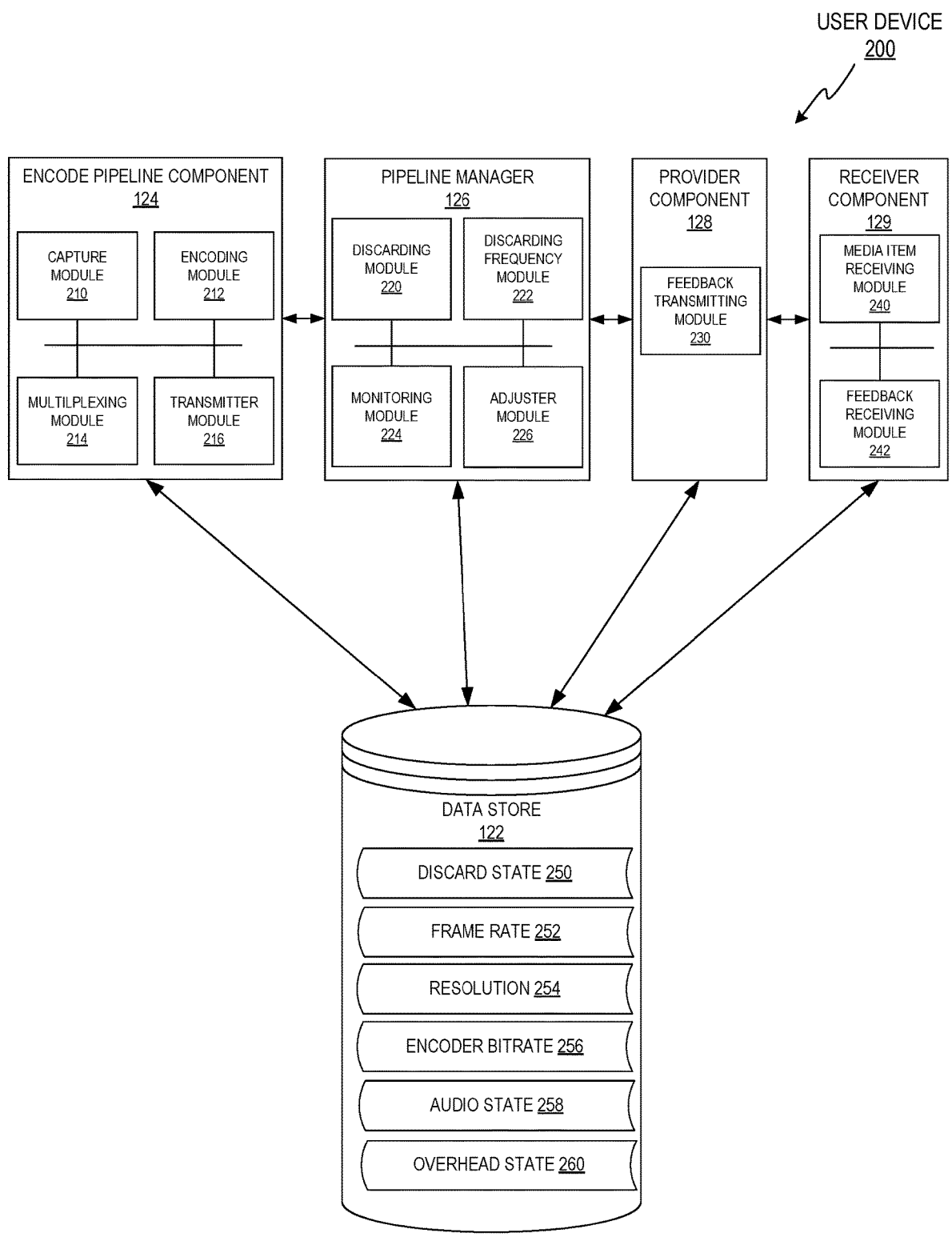
FIG. 2 is a block diagram illustrating the components and modules of an example user device, in accordance with an implementation of the disclosure.

FIG. 2 is a block diagram illustrating an example user device 200. User device 200 may be the same or similar to user devices 120A-Z. In the example shown in FIG. 2, user device 200 includes an encode pipeline component 124, a pipeline manager 126, a provider component 128, a receiver component 129, and a data store 122.

Encode pipeline component 124 may include a capture module 210, an encoding module 212, a multiplexing module 214, and a transmitter module 216.

Capture module 210 may capture video frames (e.g., new raw video frames) of a video item to be transmitted as a livestream. In one implementation, the video frames are captured using a camera integral to the user device (e.g., a mobile phone camera, a laptop camera, etc.). In another implementation, the video frames are captured using an external camera coupled to the user device (e.g., an external webcam coupled to the user device, etc.). In another implementation, the video frames are captured via the display of the user device (e.g., screen shots of the user device, streaming the display of the user device, streaming the media viewer of the user device). The capture module 210 captures video frames at one or more resolutions (e.g., an image file resolution measured in pixels, high-definition (HD), standard-definition (SD), etc.) and one or more frame rates (e.g., number of video frames per second, 15, 24, 26, 28, 30, etc.). The capture module 210 may store the current one or more resolutions in resolution 254 of the data store 122 and the current one or more frame rates in frame rate 252 of the data store 122.

In one implementation, the capture module 210 captures video frames and captures audio. The capture module 210 may capture audio at a sample rate. The capture module 210 may store audio information (e.g., audio sample rate, etc.) in the audio state 258 of data store 122.

Encoding module 212 may be an encoder of the user device. The encoding module 212 may encode one or more of the video frames captured by capture module 210. The encoding module 212 may only encode one video frame at a time (e.g., a second video frame cannot enter the encoder until the encoder finishes encoding a first video frame that has entered the encoder). Encoding module 212 may control the quality of the video frames (e.g., filter the video frames, adjust the video frames, add features to the video frames). The encoding module 212 may convert the format of the video frames (e.g., convert analog video signals into digital video streams to transmit via network 150). The encoding module 212 may perform a security function (e.g., encode the video frames to be decoded by a second user device, etc.). The encoding module 212 may be capable of encoding the video frames at one or more encoder bitrates (e.g., a high quality encoder bit rate, a low quality encoder bit rate, etc.). The encoding module 212 may store the current encoder bit rate in encoder bitrate 256 of the data store 122.

In one implementation, the encoding module 212 may include an encoder for encoding video frames and an audio encoder for encoding audio. In another implementation, the encoding module 212 includes an encoder that encodes video frames and encodes audio. The encoding module 212 may control quality of the audio, convert the format of the audio, perform a security function on the audio, and so forth.

Multiplexing module 214 may be a multiplexer (mux). Multiplexing module may multiplex the encoded video frames from the encoding module 212 with encoded audio (e.g., from the encoding module 212) to generate multiplexed data. The encoded audio may be captured and encoded similar to how the encoded video frames are captured and encoded. In one implementation, the audio may be captured and encoded without the use of a buffer. In another implementation the encoded audio is captured, encoded, and buffered. The audio may be buffered until the corresponding video frame is available.

Transmitter module 216 may transmit the multiplexed data over network 150. The media item 112 transmitted as a livestream may be the multiplexed data. The transmitter module 216 may transmit the multiplexed data to media server 110. The transmitter module 216 may transmit the multiplexed data to one or more user devices 120.

Encode pipeline component 124 may function in multiple modes including a one-on-one mode, a public mode, and a private mode.

In the one-on-one mode, the transmitter module 216 may cause the transmitted livestream to only be available to a specified user device via network 150. The user device 200 may receive user input from the specified user.

In the public mode, the transmitter module 216 may cause the transmitted livestream to be available to user devices via the network 150. The public mode may be similar to the one-on-one mode in that user device 200 may receive user input from another user, but when the public mode is enabled there may be multiple user devices. User device 200 may then select one or more of the users without selecting a specific user device. For example, the user device 200 may select all users of the network 150. In this example, the user device that is receiving the livestream may remain anonymous to user device 200. Conversely, user device 200 may transmit the livestream anonymously. In public mode, the livestream may be a public livestream so that users who are not contacts of each other may see livestreams that each other are transmitting.

The private mode may be similar to the one-on-one mode and the public mode but may include an approval stage. During the approval stage, the user device that is transmitting the livestream may receive a request to view the livestream from another user and may approve or disapprove viewing of the livestream. In one example, the approval or disapproval may be based on user input, in which case the transmitter module 216 may notify the user and the user may provide input that approves or disapproves the sharing. In private mode, the livestream may be a private livestream so that only the approved users may see what livestreams each other are transmitting.

The encode pipeline component 124 may interact with one or more of pipeline manager 126, provider component 128, or receiver component 129. In one implementation, after encode pipeline component 124 transmits a livestream, receiver component 129 may receive feedback regarding the livestream and provider component 128 may provide feedback regarding the livestream. The pipeline manager 126 may adjust quality of the livestream captured and transmitted by encode pipeline component 124.

Pipeline manager 126 may include a discarding module 220, a discarding frequency module 222, a monitoring module 224, and an adjuster module 226.

Discarding module 220 determines a first video frame did not enter the encoder prior to the second video frame arriving at the encoder (e.g., a backup in video frames), where the second video frame was captured after the first video frame, and causes the first video frame to be discarded. In one implementation, the available bitrate of the network is lower than the bitrate of the livestream, resulting in a backup of video frames to be encoded. In another implementation, the bitrate of encoding module 212 (e.g., encoder bitrate) is lower than the bitrate of the capture module 210 (e.g., bitrate from resolution and frame rate), resulting in a backup of video frames to be encoded. In another implementation, local processing overhead of the user device 200 causes a backup of video frames to be encoded. In another implementation, an audio state (e.g., multiplexing of encoded audio with encoded video, delay in encoding audio, buffering of audio, audio sample rate, etc.) causes backup of video frames to be encoded. Discarding module 220 may discard video frames so that at any point of time there is only one video frame at the encoder waiting to be encoded.

Discarding frequency module 222 determines a frequency of discarded video frames (e.g., including the first video frame). In one implementation, the frequency of discarded video frames is a ratio of video frames discarded to total video frames captured (e.g., 10% of video frames are discarded). In another implementation, the frequency is an amount of time that was transmitted (e.g., 0.9 hours of 1 hour of recording was transmitted). In another implementation, the frequency is a weight function where discarding of video frames within a quantity of time immediately preceding the determining of the frequency (e.g., more recent discarding) is weighted more heavily than discarding of video frames prior to the quantity of time immediately preceding the determining of the frequency (e.g., not as recent discarding). In another implementation, the frequency is a sliding window of time, where the discarding frequency module 222 determines a frequency of discarded video frames during the most recent window of time. Discarding frequency module 222 may store a frequency of discarded video frames in discard state 250 of data store 122.

The monitoring module 224 may monitor metrics including a video state of the livestream (e.g., discard state 250, frame rate 252, resolution 254, encoder bitrate 256, etc.), an audio state 258 of the livestream, and/or an overhead state 260 of the user device 200. In one implementation, the monitoring module 224 monitors, determines, stores, and updates discard state 250, frame rate 252, resolution 254, encoder bitrate 256, audio state 258, and/or overhead state 260 in the data store 122. The monitoring module 224 may determine overhead state 260 of the user device 200 from one or more of central processor unit (CPU) usage (e.g., percentage of time the processor is running one or more threads, percentage of the CPU that is idle), memory usage (amount of main memory currently used by processes, amount of memory that is available), etc. In another implementation, the monitoring module 224 also monitors the available bitrate of the network 150 and the bitrate of the livestream.

The adjuster module 226 adjusts the quality of the video item transmitted as the livestream based on the metrics monitored by monitoring module 224. The adjuster module 226 may combine the metrics into a unified value to make a decision on how to adjust the bitrate (e.g., quality) of the livestream. The adjuster module 226 may determine that the bitrate of the livestream is above a first threshold frequency (e.g., the available bandwidth of network 150 is decreasing, the frequency of the discarded video frames of the discard state 250 is above a first threshold frequency, the CPU usage of the overhead state is 260 is above a first processing overhead threshold value, the audio sampling rate of audio state 258 is causing delays above a first threshold value, etc.). The adjuster module 226 may adjust the bitrate along multiple dimensions. The adjuster module 226 may have an order of adjusting different dimensions of the livestream. The adjuster module 226 may adjust one dimension of the livestream, determine if the bitrate of the livestream is still too high (e.g., the frequency of the discarded video frames is still above a first threshold frequency), and then adjust the next dimension of the livestream. For example, when the frequency of discarded video frames is too high, the adjuster module 226 may first reduce frame rate, second reduce encoder bitrate, third reduce resolution and restore frame rate, fourth reduce frame rate, and sixth further reduce encoder bitrate. The adjuster module 226 may follow an opposite flow when the frequency of discarded video frames is below a second threshold (e.g., no video frames are being discarded). Alternatively, the adjuster module 226 may have a different order of adjusting different dimensions of the livestream. In one implementation, the user may select an order of adjusting different dimensions of the livestream. In one implementation, the encode pipeline component 124 may stop generating a livestream when the frequency of discarded video frames is above a third threshold value (e.g., 50% of the video frames are discarded) after all dimensions of the livestream have been adjusted (e.g., at the lowest resolution, frame rate, and encoder bitrate).

In one implementation, the adjuster module 226 may determine a specific portion of the encode pipeline component 124 that is causing delay and adjust that specific portion of the encode pipeline component 124. For example, the adjuster module 226 may determine the discard state 250 is a frequency above the first threshold and that the network bandwidth, encoder bitrate 256 (e.g., at the highest setting), audio state 258 (e.g., at a normal or low setting), and overhead state 260 (e.g., at a normal or low processing overhead) are not causing the frequency to be above the first threshold. The adjuster module 226 may determine that the resolution 254 and frame rate 252 are causing a captured video bitrate that is higher than the encoder bitrate 256 and may decrease the resolution and/or frame rate 252 so that the captured video bitrate is not higher than the encoder bitrate 256. In another implementation, the monitoring module 224 may determine a specific portion of the encode pipeline component 124 or overhead state 260 is causing delay and cause the adjuster module 226 to adjust the specific portion.

Provider component 128 may include a feedback transmitter module 230 and receiver component 129 may include a media item receiving module 240 and a feedback receiving module 242. The user device 200 may transmit a livestream via transmitter module 216 to a second user device. The second user device may receive the livestream via media item receiving module 240 of the user device 200. The second device may transmit feedback 152 (e.g., a comment on the livestream video, a conversation, a chat message, a post) via the feedback transmitter module 230 of the second user device. The user device 200 may receive the feedback 152 via feedback receiving module 242 and may transmit feedback 152 in response to the received feedback 152. Since the user device 200 performs zero-copy adaptive bitrate video streaming (e.g., does not have a transmission buffer), not only does the transmitted livestream avoid the latency and resource cost associated with a transmission buffer, but the feedback 152 back and forth between user device 200 and other devices also does not have the latency and resource cost associated with a transmission buffer.

Figure 3:
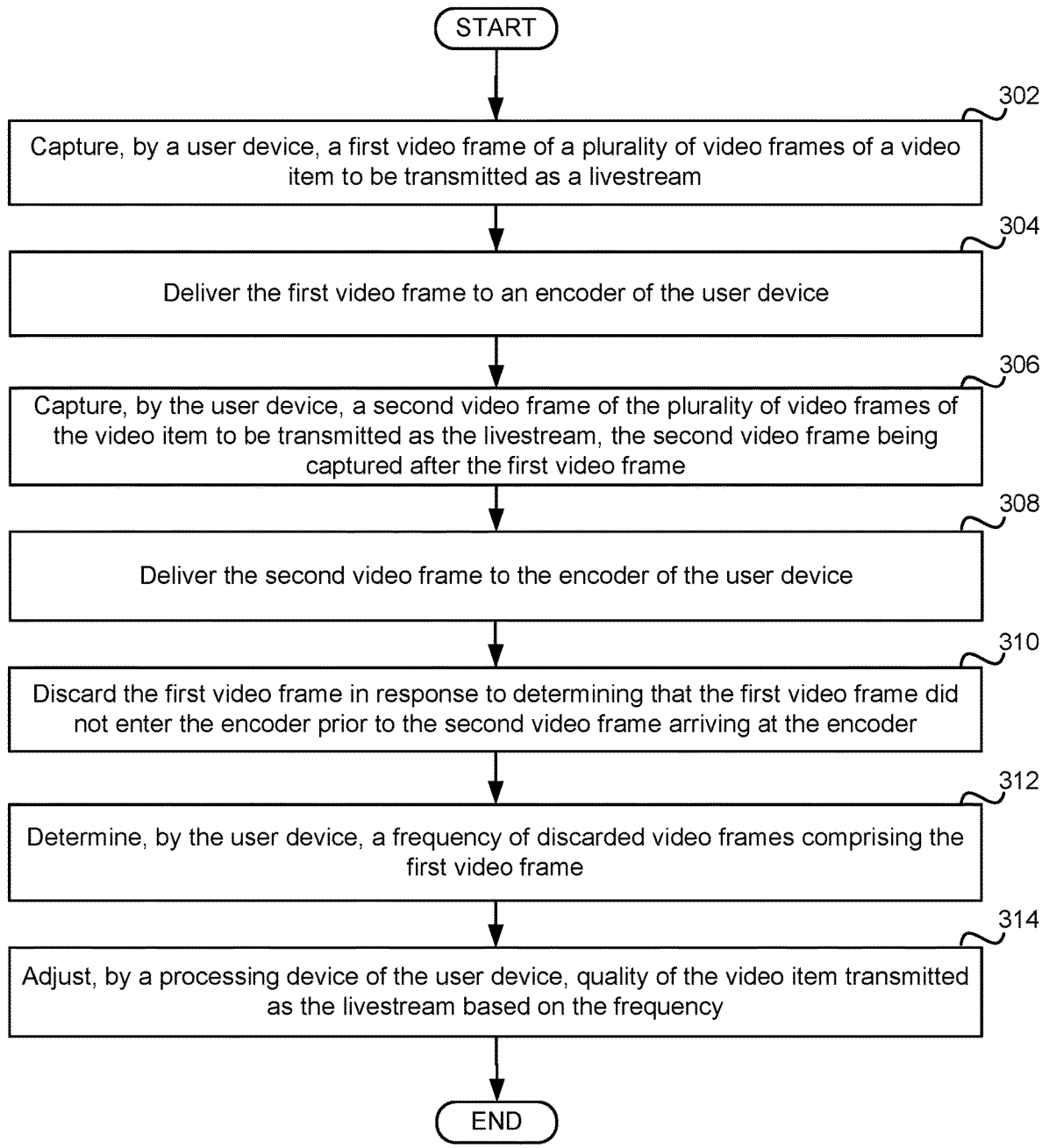
FIG. 3 is a flow diagram illustrating an example method of a user device that performs zero-copy adaptive bitrate video streaming, in accordance with an implementation of the disclosure.

FIG. 3 depicts a flow diagram for illustrative examples of method 300 for implementing zero-copy adaptive bitrate video streaming. Method 300 is an example method from the perspective of the first user device. Method 300 may be performed by processing devices that may include hardware (e.g., circuitry, dedicated logic), software (such as is run on a general purpose computer system or a dedicated machine), or a combination of both. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by user device 120 of FIG. 1.

Referring to FIG. 3, method 300 may be performed by one or more processing devices of a user device to adjust quality of a livestream.

Method 300 may begin at block 302 where the processing device of a user device may capture a first video frame of a plurality of video frames of a video item to be transmitted as a livestream.

At block 304, the processing device may deliver the first video frame to an encoder of the user device.

At block 306, the processing device may capture a second video frame of the plurality of video frames of the video item to be transmitted as the livestream. The second video frame is captured after the first video frame.

At block 308, the processing device may deliver the second video frame to the encoder of the user device. The processing device may capture the second video frame at a frame rate of the user device and a resolution of the user device.

At block 310, the processing device may discard the first video frame in response to determining that the first video frame did not enter the encoder prior to the second video frame arriving at the encoder. The processing device may capture a third video frame of the plurality of video frames after the second video frame and not discard the second video frame in response to determining the second video frame entered the encoder prior to the third video frame arriving at the encoder. The second video frame may be encoded by the encoder to generate an encoded video frame. The second frame may be encoded at an encode bitrate of the encoder. In one implementation, the processing device may multiplex the encoded video frame with encoded audio data to generate multiplexed data.

At block 312, the processing device may determine a frequency of discarded video frames including the first video frame. In one implementation, the processing device may determine the frequency is above a first threshold frequency. In another implementation, the processing device may determine the frequency is below a second threshold frequency.

At block 314, the processing device may adjust quality of the video item (e.g., including second video frame) transmitted as the livestream based on the frequency. The video item transmitted as the livestream may include the multiplexed data. The processing device adjusting the quality of the video item may include adjusting (e.g., reducing in response to determining the frequency is above a first threshold frequency, increasing in response to determining the frequency is below a second threshold frequency) one or more of the frame rate, the resolution or the encoder bitrate. The processing device adjusting the quality of the video item may be further based on a unified value created by combining metrics created by monitoring the plurality of video frames, the encoded audio data, and processing overhead of the user device.

In one implementation, the livestream is an ABR video stream. In one implementation, the transmitting of the livestream and adjusting the livestream is without use of a buffer. In another implementation, method 300 does not use a buffer (e.g., a transmission buffer).

Figure 4:
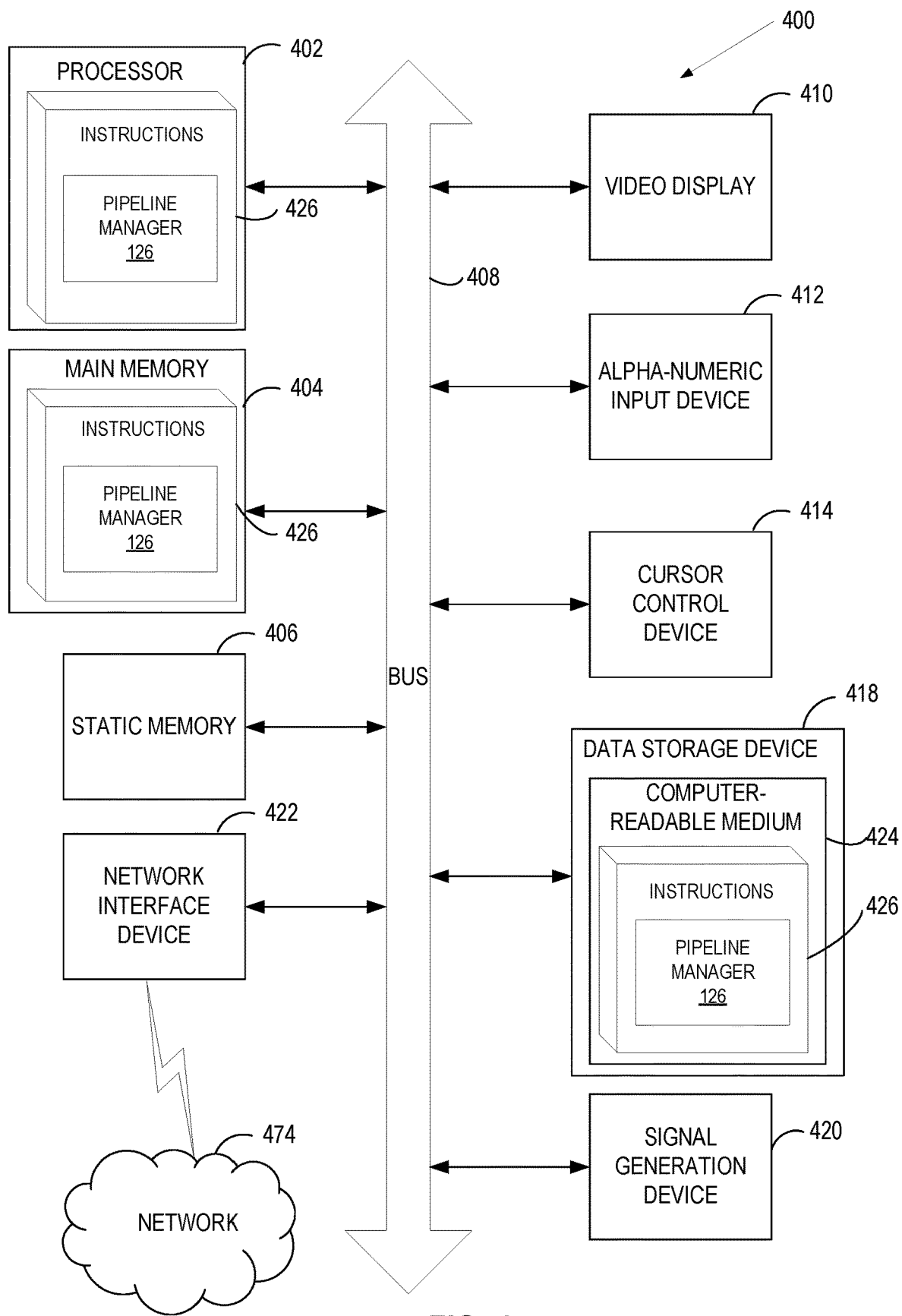
FIG. 4 is a block diagram illustrating one implementation of a computer system, in accordance with an implementation of the disclosure.

FIG. 4 depicts a block diagram of a computer system operating in accordance with one or more aspects of the present disclosure. In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alphanumeric input device 412 (e.g., a keyboard), a cursor control device 414 (e.g., a mouse), and a signal generation device 420.

Data storage device 416 may include a non-transitory computer-readable storage medium 424 (e.g., non-transitory machine-readable storage medium) on which may store instructions 426 encoding any one or more of the methods or functions described herein, including instructions pipeline manager 126 of FIG. 2 and for implementing method 300.

Instructions 426 may also reside, completely or partially, within volatile memory 404 and/or within processing device 402 during execution thereof by computer system 400, hence, volatile memory 404 and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "capturing," "delivering," "discarding," "determining," "adjusting," "encoding," "multiplexing," "monitoring," "creating," "combining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
capturing, by a user device, a first video frame of a plurality of video frames of a video item to be transmitted as a livestream;
delivering the first video frame to a queue for an encoder of the user device;
capturing, by the user device at a frame rate of the user device and a resolution of the user device, a second video frame of the plurality of video frames of the video item to be transmitted as the livestream, the second video frame being captured after the first video frame;
delivering the second video frame to the queue for the encoder of the user device;
in response to determining that the first video frame did not enter the encoder prior to the second video frame arriving at the queue for the encoder, discarding the first video frame without the first video frame having entered the encoder;
in response to determining the second video frame entered the encoder prior to a third video frame arriving at the queue for the encoder, determining that the second video frame is not to be discarded by the user device, and encoding, by the encoder at an encoder bitrate of the encoder, the second video frame to generate an encoded video frame, the third video frame being captured after the second video frame;

determining, by the user device, a frequency of discarded video frames having been discarded without having entered the encoder, the discarded video frames comprising the first video frame; and responsive to the frequency exceeding a threshold frequency, reducing, by a processing device of the user device, quality of the video item transmitted as the livestream based on the frequency by reducing one or more of the frame rate of the user device, the resolution of the user device, or the encoder bitrate of the encoder.

2. The method of claim 1, wherein:

the first video frame did not enter the encoder responsive to an initial frame being in the encoder when the second video frame arrived at the queue for the encoder;

the second video frame entered the encoder responsive to the initial frame having been encoded by the encoder prior to the third video frame arriving at the queue for the encoder; and the method further comprises multiplexing, by the user device, the encoded video frame with encoded audio data to generate multiplexed data, wherein the video item transmitted as the livestream comprises the multiplexed data.

3. The method of claim 2 further comprising:

responsive to the frequency being below a second threshold frequency, increasing the quality of the livestream by increasing one or more of the frame rate of the user device, the resolution of the user device, or the encoder bitrate of the encoder.

4. The method of claim 2 further comprising:

monitoring the plurality of video frames, the encoded audio data, and processing overhead of the user device;

creating metrics based on the monitoring; and combining the metrics into a unified value, wherein adjusting the quality of the livestream is further based on the unified value.

5. The method of claim 1, wherein the livestream is an adaptive bitrate (ABR) video stream.

6. The method of claim 1, wherein transmitting of the livestream and adjusting the livestream is without use of a buffer.

7. A user device comprising:

a memory;

an encoder; and a processing device coupled to the memory and the encoder, wherein the processing device is to:

capture a first video frame of a plurality of video frames of a video item to be transmitted as a livestream;

deliver the first video frame to a queue for the encoder;

capture, at a frame rate of the user device and a resolution of the user device, a second video frame of the plurality of video frames of the video item to be transmitted as the livestream, the second video frame being captured after the first video frame;

deliver the second video frame to the queue for the encoder of the user device;

discard the first video frame without the first video frame having entered the encoder in response to determining that the first video frame did not enter the encoder prior to the second video frame arriving at the queue for the encoder;

in response to determining the second video frame entered the encoder prior to a third video frame arriving at the queue for the encoder, determine that the second video frame is not to be discarded by the user device, wherein the encoder is to encode the second video frame at an encoder bitrate of the encoder to generate an encoded video frame, the third video frame being captured after the second video frame;

determine a frequency of discarded video frames having been discarded without having entered the encoder, the discarded video frames comprising the first video frame; and in response to the frequency exceeding a threshold frequency, reduce quality of the video item transmitted as the livestream based on the frequency by reducing one or more of the frame rate of the user device, the resolution of the user device, or the encoder bitrate of the encoder.

8. The user device of claim 7, wherein:

the first video frame did not enter the encoder responsive to an initial frame being in the encoder when the second video frame arrived at the queue for the encoder;

the second video frame entered the encoder responsive to the initial frame having been encoded by the encoder prior to the third video frame arriving at the queue for the encoder; and the processing device is further to multiplex the encoded video frame with encoded audio data to generate multiplexed data, wherein the video item transmitted as the livestream comprises the multiplexed data.

9. The user device of claim 8, wherein the processing device is further to:

responsive to the frequency being below a second threshold frequency, increase the quality of the livestream by increasing one or more of the frame rate of the user device, the resolution of the user device, or the encoder bitrate of the encoder.

10. The user device of claim 8, wherein the processing device is further to:

monitor the plurality of video frames, the encoded audio data, and processing overhead of the user device to create metrics; and combine the metrics into a unified value, wherein adjusting the quality of the livestream is further based on the unified value.

11. The user device of claim 7, wherein the livestream is an adaptive bitrate (ABR) video stream.

12. The user device of claim 7, wherein transmitting of the livestream and adjusting the livestream is without use of a buffer.

13. A non-transitory machine-readable storage medium storing instructions which, when executed cause a processing device of a user device to perform operations comprising:

capturing a first video frame of a plurality of video frames of a video item to be transmitted as a livestream;

delivering the first video frame to a queue for an encoder of the user device;

capturing, at a frame rate of the user device and a resolution of the user device, a second video frame of the plurality of video frames of the video item to be transmitted as the livestream, the second video frame being captured after the first video frame;

delivering the second video frame to the queue for the encoder of the user device;

in response to determining that the first video frame did not enter the encoder prior to the second video frame arriving at the queue for the encoder, discarding the first video frame without the first video frame having entered the encoder;

in response to determining the second video frame entered the encoder prior to a third video frame arriving at the queue for the encoder, determining that the second video frame is not to be discarded by the user device, and encoding, by the encoder at an encoder bitrate of the encoder, the second video frame to generate an encoded video frame, the third video frame being captured after the second video frame;

determining, by the user device, a frequency of discarded video frames having been discarded without having entered the encoder, the discarded video frames comprising the first video frame; and responsive to the frequency exceeding a threshold frequency, reducing, by the processing device, quality of the video item transmitted as the livestream based on the frequency by reducing one or more of the frame rate of the user device, the resolution of the user device, or the encoder bitrate of the encoder.

14. The non-transitory machine-readable storage medium of claim 13, wherein:

the first video frame did not enter the encoder responsive to an initial frame being in the encoder when the second video frame arrived at the queue for the encoder;

the second video frame entered the encoder responsive to the initial frame having been encoded by the encoder prior to the third video frame arriving at the queue for the encoder; and the operations further comprising multiplexing, by the user device, the encoded video frame with encoded audio data to generate multiplexed data, wherein the video item transmitted as the livestream comprises the multiplexed data.

15. The non-transitory machine-readable storage medium of claim 14, wherein the operations further comprise:

responsive to the frequency being below a second threshold frequency, increasing the quality of the livestream by increasing one or more of the frame rate of the user device, the resolution of the user device, or the encoder bitrate of the encoder.

16. The non-transitory machine-readable storage medium of claim 14, the operations further comprising:

monitoring the plurality of video frames, the encoded audio data, and processing overhead of the user device;

creating metrics based on the monitoring; and combining the metrics into a unified value, wherein adjusting the quality of the livestream is further based on the unified value.

17. The non-transitory machine-readable storage medium of claim 13, wherein:

the livestream is an adaptive bitrate (ABR) video stream; and transmitting of the livestream and adjusting the livestream is without use of a buffer.

* * * * *